July 20, 1971 V. D. ALLRED 3,594,287
APPARATUS FOR COOLING SOLIDS BY DIRECT CONTACT WITH LIQUIDS
Filed Dec. 22, 1969 2 Sheets-Sheet 1

INVENTOR
VICTOR D. ALLRED

BY

ATTORNEY

INVENTOR
VICTOR D. ALLRED

3,594,287
APPARATUS FOR COOLING SOLIDS BY DIRECT CONTACT WITH LIQUIDS

Victor D. Allred, Littleton, Colo., assignor to Marathon Oil Company, Findlay, Ohio
Filed Dec. 22, 1969, Ser. No. 887,449
Int. Cl. C10b 7/02, 39/06
U.S. Cl. 202—103                                                6 Claims

ABSTRACT OF THE DISCLOSURE

Into the soaking pit of a rotary hearth calciner is inserted an inverted funnel smaller in diameter than the soaking pit and having internal water sprays directed on hot material flowing underneath the funnel. The water cools the coke directly, generating steam which flows up through the funnel and out through the conventional calciner stack.

CROSS REFERENCES TO RELATED APPLICATIONS

No U.S. patent applications related to coolers of the type herein described are known to the inventor.

BACKGROUND OF THE INVENTION (1) Field of the invention

The invention relates to apparatus for cooling solid materials exiting from the hearth of a furnace by direct contact with a liquid spray.

(2) Description of the prior art

British 1,055,857 shows a rotary hearth calciner having a soaking pit, deals with how the material is calcined by the rotary hearth furnace rather than how the calcined material is cooled. In actual practice, vibrating air-cooled conveyers, water-cooled rotating drums and water-sprays which are external to the furnace have been utilized to cool the calcined materials. These methods have required additional space and have involved very significant capital investment in the cooling equipment and in the conveyor system for moving the hot material into the external cooler. In the case of direct-water sprays, the vaporized water must be adequately disposed of, and the fines carried with the steam recovered by cyclone separators and bag filters.

SUMMARY (1) General statement of the invention

The present invention accomplishes all or at least a major portion of the cooling of the calcined material internally within the lower portion of the soaking pit of the rotary hearth furnace. Because of the simple, non-moving design of the invention, capital investment for cooling apparatus is kept low. Because it is internal to the furnace, the cooling apparatus requires no external space. Disposal of the vaporized water is accomplished directly through the conventional stack of the furnace.

According to the invention, into the soaking pit of a rotary hearth calciner is inserted an inner chamber, e.g. an inverted funnel-shaped chamber, smaller in diameter than the soaking pit. Within this chamber are located water sprays directed onto hot material flowing underneath the funnel. Suitable means is provided for detaining the hot material in the lower portion of the soaking pit for a time sufficient to provide adequate contact with the liquid, e.g. water being sprayed from the nozzles so as to effect the desired amount of cooling.

A particular advantage of the present invention is that the fines which are commonly included within the material being calcined will tend to segregate to the lower portion of the material passing by the water sprays. The water sprays will thus preferentially wet the larger lumps of calcined material, thus minimizing the entrainment of fines into the steam and the formation of solid caked material which might be formed if the fines were excessively wet by the water sprays. The reduction in the amount of entrained fines avoids excessive particulate matter in the gaseous effluents from the stack, reducing the possibility of air pollution. Further, what particulate matter is suspended in the stack gases will normally be completely burned in the after burner which is a part of most rotary hearth calcining installations.

In general, the inner chamber can rotate with the hearth or other portion of the furnace (or can be stationary if desired). The inner chamber may be constructed of any suitable conventional material adequate to withstand the environment of the soaking pit, e.g. steel, titanium, castable refractories, prestressed brick work. Water cooling, e.g. by circulating: through the walls or through a jacket, internal or external to the inner chamber can be provided if desired.

The water sprays or other liquid sprays can be of conventional design with nozzles giving the desired degree of fineness of droplets. They may be connected to a suitable source of water under pressure by piping of suitable materials. In those instances where it is desired to have the inner chamber rotate, a conventional high-temperature surface rotating seal can be provided in the piping delivering liquid to the spray nozzles, or the sprays can be stationary.

Liquid coolant will, in most cases, be water and may be water which has been previously used for cooling either the inner chamber, the rabbles or other portions of the furnace.

(2) Utility of the invention

The present invention is useful for the cooling of a wide variety of calcined solid materials exiting from the hearth of a rotary hearth furnace. These include coke, e.g. delayed petroleum coke, fluid petroleum coke; coal, e.g. bitmuminous, anthracite, limestone, garbage residues, and any other materials which can be contacted with water in such a fashion without deleterious effect.

DESCRIPTION OF THE PREFERRED EMBODIMENTS (1) Starting materials

The starting materials utilized in the invention may be any of the aforementioned materials capable of being calcined with a rotary hearth furnace which are not deleteriously effected by contact with limited amounts of water.

The cooling liquid is generally water but can be any nonflammable liquid including, where desired, liquids which will react with the hot solid materials to form a desired chemical product.

The amount of liquid injected per pound of solid material processed by the furnace will vary with the temperature of the material exiting from the hearth, the latent heat of vaporization of the liquid and the desired temperature of the solid material when it exits from the furnace. As an approximate example, when processing delayed petroleum coke having a particle size roughly in range below about two inches, from 0.1 to about 1.0, more preferably 0.4 to about 1.0, and most preferably 0.6 to about 0.8 pound of cooling water can be sprayed onto each pound of coke.

(2) Example

Figure 1:
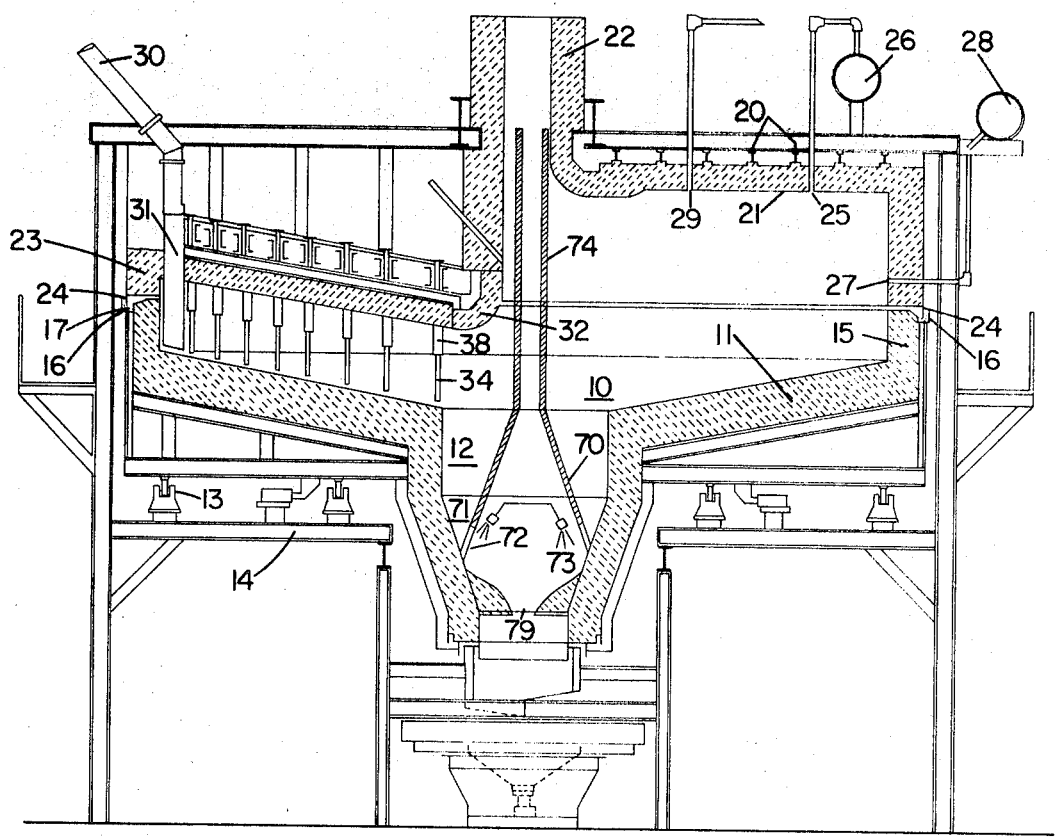
FIG. 1 is a section view of the rotary hearth furnace showing schematically the inner chamber and "stub" chimney which directs vaporized water and any other gases generated by contact of the water with the hot materials into the main stack of the rotary hearth furnace.
Figure 2:
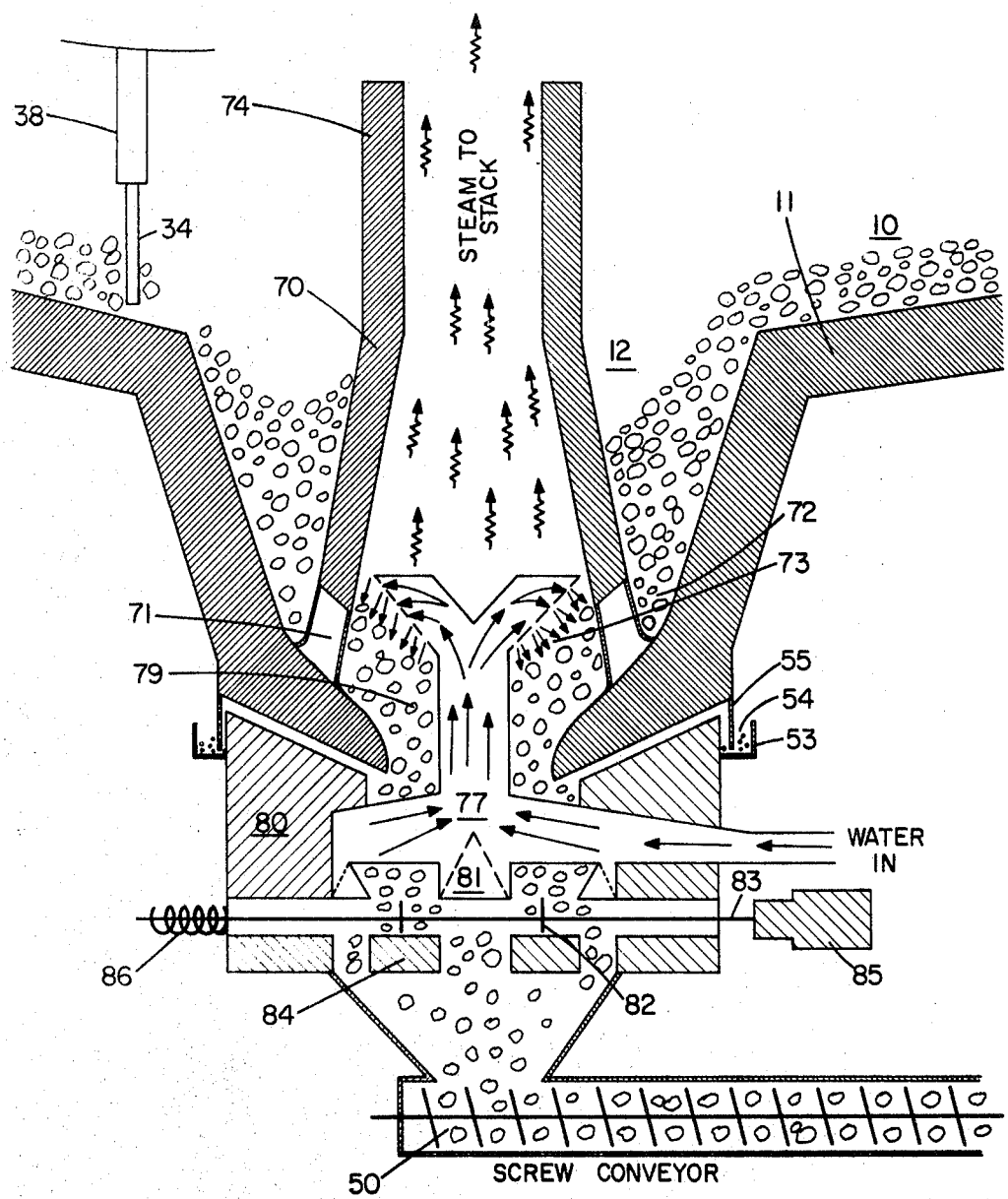
FIG. 2 is a detail section view of the soaking pit of the rotary hearth furnace of FIG. 1.

FIG. 1 illustrates a furnace having a rotary hearth 10 with an inner hearth surface 11 sloping from the outer periphery downwardly to a central axially extending soaking pit 12 integral with and depending from the hearth 10. The rotary hearth 10 is supported on suitable rollers 13 and furnace frame 14 and is driven by a motor and drive in conventional manner for rotary hearth furnace. A curb 15 extends vertically above the hearth's furnace 11 at its outer periphery and carries a trough 16 with sand 17. Greater detail of a second sand seal is shown in FIG. 2 where trough 53 is filled with sand 54 and carrying flange 55 extends into the sand 54 in trough 53. Other conventional sealing means may be substituted.

Roof beams 20 support a refractory roof 21 having a central stack or flue 22. The roof 21 has a depending wall 23 carrying flange 24 which extends into the sand 17 in trough 16, forming a rotary sand seal between the hearth 10 and the roof 21. The roof 21 is provided with air ports 25 receiving air from duct 26 mounted on the furnace frame 14. The ports 25 direct air downwardly toward the hearth. Side walls 23 of the roof are provided with ports 27 receiving air from duct 28 also mounted on the frame 14. Conventional burners 29 are provided to heat the furnace in cases where oxidation of volatile matter driven off from the material being calcined does not provide sufficient heat. A feed chute 30 passes through the roof 21 and has a vertically adjustable delivery end 31 to deliver a selected thickness of feed onto the hearth. A radially extending U-shaped rabble pit 32 is formed in the roof from the stack 22 to the roof wall 23. The bottom of the pit 32 is provided with slots (not shown) adapted to slidably receive rabbles 34 which may be solid or hollow plate-like structures and which may be water or air cooled. Refractory seals 38 are provided to fit within the slots.

Inverted-funnel-shaped chamber 70 is located within the soaking pit and supported by four narrow refractory supports 71, and each approximately one foot wide which rest on the inner wall of the soaking pit 12. Between supports 71 there are wide areas 72 open to the passage of coke. Water sprays 73 direct liquid downward onto the coke as it passes into the lower portion of the soaking pit. A constriction 79 at the bottom of the soaking pit constricts the passage of exit of solid material from the soaking pit. Stub stack 74 extends upward into the base of the conventional furnace stack 22.

FIG. 2 shows an adjustable discharge grate mechanism 80 comprising stationary parallel triangular-cross-bars 81 between which the coke passes, scrapers 82 and an actuating rod 83 which scrape coke through the space between rectangular cross-section stationary cross-bars 84. The scrapers are actuated by a hydraulic or pneumatic operator 85 acting in opposition to a return spring 86 at the opposite end of rod 83. Additional details of this type of discharge grate can be found in U.S. Pat. 3,401,922.

By varying the frequency of oscillation of the scrapers, the amount of flow through the discharge mechanism can be controlled, providing control of the detention of the coke in the lower portion of the soaking pit.

An adjustable screw conveyer 50 is provided beneath the discharge grate to receive the output therefrom and convey it to storage or transport vehicles.

Other discharge devices, e.g. the discharge table shown in British Pat. 1,055,857, can be substituted for the aforementioned discharge mechanisms.

In operation, coke is pushed from the hearth 10 into the soaking pit 12 by the action of rabble 34. The coke moves downward through the annular space formed by the interior wall of soaking pit 12 and the exterior wall of inner chamber 70. The coke finally moves through opening 72 to the lower portion of the soaking pit where the hot coke is contacted by water from water spray 73. Water is fed into the water sprays through manifold 77. Because the water sprays 73 are stationary the manifold is a simple pipe arrangement without the need for seals or specialized fittings. In other embodiments, the cooling water manifold can enter through an opening in the stack and descend through the stack to the lower portion of the inner chamber.

Control of the water flow to the spray 73 gives the desired cooling. The coke then exits to bottom outlet 79 of the soaking pit 12 into the discharge mechanism 80 which conveys it to further cooling, e.g. by exposure to air or directly to storage.

(3) Modifications of the invention

It should be understood that the invention is capable of a variety of modifications and variations which will be made apparent to those skilled in the art by a reading of the specification and which are to be included within the spirit of the claims appended hereto. For example, the shape of the inner chamber need not be that of an inverted funnel but may, instead, be a concentric cylinder; the hearth of the rotating hearth furnace need not rotate but the coke may be transported across a stationary hearth by means of vibration or by rabbles which rotate radially or other suitable means; the constriction which detains the coke for sufficient contact with the spraying liquid may be a series of grates or may merely be the normal constriction afforded by the sloping walls of conventional soaking pit; the inverted funnel or stub stack need not be attached to the soaking pit, but may be independently supported from the water spray mechanism.

What is claimed is:

1. In apparatus for treating solid materials which apparatus comprises a heated chamber and a hearth in said chamber, a material outlet at the center of the hearth, means for delivering material to the hearth adjacent to the outer periphery thereof to form a bed of material on the hearth, means for moving said material across the hearth to the material outlet, and a vertical chamber located at said material outlet, which vertical chamber conveys said solid material from said outlet, the improvement comprising:

(a) a second vertical chamber within said first vertical chamber, said second vertical chamber being spaced from the sidewalls and from the lower portion of said first vertical chamber and being closed to the flow of said material and having side walls which extend only within an upper portion of said first vertical chamber;

(b) at least one liquid spray device located within said second vertical chamber for directing a spray of liquid downward into the lower portion of said first vertical chamber;

(c) detention means for detaining said material at a point within the lower portion of said first vertical chamber;

(d) conduit means within said apparatus and communicating with said second vertical chamber for conducting vaporized liquid and gases generated upon contact of said liquid with said materials from said apparatus.

2. The apparatus of claim 1 wherein both vertical chambers are substantially circular in horizontal cross-section.

3. The apparatus of claim 1 wherein the liquid is water.

4. The apparatus of claim 1 wherein the material being treated is coke.

5. The apparatus of claim 1 wherein the hearth and the first vertical chamber comprise one rotating unit and wherein the second vertical chamber is substantially stationary.

6. Apparatus of claim 1 wherein the material is transported across the hearth by rabbles.

References Cited
UNITED STATES PATENTS

| | | | |
|---|---|---|---|
| 1,677,973 | 7/1928 | Marguard | 201—39 |
| 1,848,818 | 3/1932 | Becber | 201—39 |
| 3,475,286 | 10/1969 | Kemmerer et al. | 202—117 |

ALBERT W. DAVIS, Jr., Primary Examiner

U.S. Cl. X.R.

202—216, 227; 263—53